United States Patent
Gahn et al.

(10) Patent No.: US 8,182,185 B2
(45) Date of Patent: May 22, 2012

(54) SELF-TAPPING SCREW

(75) Inventors: Juergen Gahn, Altstaetten (CH);
Andreas Vorhauer, Sulz (AT)

(73) Assignee: Hilti Aktiengesellschaft, Schaan (LI)

( * ) Notice: Subject to any disclaimer, the term of this patent is extended or adjusted under 35 U.S.C. 154(b) by 263 days.

(21) Appl. No.: 12/290,255

(22) Filed: Oct. 28, 2008

(65) Prior Publication Data

US 2009/0110513 A1     Apr. 30, 2009

(30) Foreign Application Priority Data

Oct. 31, 2007   (DE) .................... 10 2007 000 605

(51) Int. Cl.
*F16B 25/08* (2006.01)

(52) U.S. Cl. ............... 411/386; 411/387.4; 411/417

(58) Field of Classification Search ............ 411/311, 411/386, 387.1, 387.4, 411, 417
See application file for complete search history.

(56) References Cited

U.S. PATENT DOCUMENTS

| | | | |
|---|---|---|---|
| 3,426,642 A * | 2/1969 | Phipard, Jr. ............ | 411/417 |
| 3,643,722 A * | 2/1972 | Oestereicher ............ | 411/334 |
| 3,835,694 A * | 9/1974 | Skierski ............ | 72/469 |
| 6,599,072 B1 * | 7/2003 | Gerhard ............ | 411/387.4 |
| 7,740,435 B2 * | 6/2010 | Gstach et al. ............ | 411/386 |
| 7,780,388 B2 * | 8/2010 | Yamaki ............ | 411/386 |
| 2006/0120826 A1 | 6/2006 | Wieser | |
| 2006/0193713 A1 | 8/2006 | Gerhard | |
| 2007/0297873 A1 * | 12/2007 | Wieser et al. ............ | 411/411 |

* cited by examiner

*Primary Examiner* — Flemming Saether
(74) *Attorney, Agent, or Firm* — Abelman, Frayne & Schwab

(57) ABSTRACT

A screw (11) includes at least one thread (21) arranged on the screw shaft (12); circumferentially surrounding the shaft (12) at least in some regions, and having a thread pilot (22) located in the free region (15) of the shaft (12) and a plurality of recesses (31) provided in the thread (21) and opening radially outwardly, with the recesses (31) each having a first limiting wall (32) adjacent to the thread pilot (22) and a second limiting wall (33) remote from the thread pilot (22), and a plurality of cutting bodies (26) formed of a material having a hardness greater than a hardness of the thread, located in the recesses (31) formed in the thread (21) and having each a longitudinal axis (27) and an outer surface (28) surrounding the axis (27) at a distance therefrom, with the recesses (31) each having a bearing section (34) with a plurality of generatrices extending substantially along a course of the thread (21) for receiving, at least in some regions, the outer surface (28) of a respective cutting body (26).

9 Claims, 1 Drawing Sheet

SELF-TAPPING SCREW

BACKGROUND OF THE INVENTION

1. Field of the Invention

The present invention relates to a screw having a shaft having an outer radial surface and a free end region, and at least one thread arranged on the shaft circumferentially surrounding the shaft at least in some regions, and having a radial outer profile, two side flanks, a thread pilot located in the free region of the shaft, and a plurality of recesses provided in the thread and opening radially outwardly, with the recesses each having a first limiting wall adjacent to the thread pilot and a second limiting wall remote from the thread pilot. A plurality of cutting bodies formed of a material having a hardness greater than a hardness of the thread is located in the recesses formed in the thread, with each cutting body having a longitudinal axis and an outer surface surrounding the axis at a distance from the axis.

2. Description of the Prior Art

A screw, which is described above, is screwed in a borehole that was preliminary formed in a constructional component, with the thread of the screw forming or tapping a counter-thread or an undercut in the constructional component.

For outside applications, the screws, such as concrete screws, advantageously, are formed of a corrosion-resistant steels. However, steel materials often have a hardness that is not sufficient for tapping a counter-thread in a mineral constructional component, and the thread of the screw wears off during the screw being screwed in. Toughening of the screw or, e.g., of the thread, which is formed integrally with the shaft, is possible only to a limited extent when a corrosion-resistant material is used for forming the screw.

German Publication DE 198 52 338 A1 discloses a screw which is formed of a stainless steel and the shaft and thread of which are provided with a plurality of receiving bores in form of recesses which extend radially with respect to the longitudinal axis of the screw and in which cutting bodies in form of cylindrical cutting pin inserts of a hardened steel are received. The cutting pin inserts facilitate cutting-in even in hard mineral constructional components such as, e.g. concrete or brickwork. The recesses have, in the thread, a first limiting wall adjacent to the thread pilot, and a second limiting wall remote from the thread pilot. The limiting walls have a profile for receiving, at least in some regions, the outer surface of cutting pin inserts which have a circular cross-section. The cutting pin inserts are retained in the receiving recesses in the shaft formlockingly in the screw in direction and frictionally in the radial direction.

One of the drawbacks of the screw described above consists in that all of the cutting pin inserts project radially beyond the cross-sectional projection surface of the thread to the same extent. In order to set such thread-tapping screws, a high screw-in torque is required, in particular, for screws with a small diameter.

Another drawback of the above-described screw consists in that its manufacture is very expensive. This is because a number of cutting pin inserts need be separately knock in a number of the receiving recesses and then finished.

Accordingly, an object of the present invention is to provide a thread-tapping screw that permits to improve the setting of the screw in a hard constructional component, e.g., concrete.

Another object of the present invention is to provide a thread-tapping screw that can be simply manufactured.

SUMMARY OF THE INVENTION

These and other objects of the present invention, which will become apparent hereinafter, are achieved by providing a screw, as described above, and in which each recess has a bearing section with a plurality of generatrices extending substantially along a course of the thread for receiving, at least in some regions, the outer surface of a respective cutting body.

With the recesses having a bearing section with a plurality of generatrices, the cutting bodies, which are, preferably, formed of a hard metal, are inserted in the recesses and are easily positioned there. Therefore, they can easily secure in the thread. The shape of the bearing section enables a shaped encasing, at least in some regions, of the cutting bodies and, thus, an advantageous anchoring of the cutting bodies in the thread.

The manufacturing process of the inventive screw is not only easy but also stable as no small tolerance field is needed, and this insures an economical manufacture. With the shape of the recesses, the number of the methods used for securing a cutting body in a recess noticeably increases. E.g., a cutting body can be secured by welding, in particular, resistance welding.

A small embedding of the cutting bodies in the thread is sufficient for an adequate anchoring of the cutting bodies in the thread for tapping the constructional component. Though the cutting bodies are not anchored in the core diameter of the shaft, few or no cutting bodies break and fall out during the screw-in process. Thus, all of the cutting bodies set in the thread are available for the entire thread-tapping process.

Advantageously, the bearing section is inclined toward the shaft outer surface so that the plane, in which the bearing section lies forms with the radial outer surface and/or one of the side flanks of the thread an angle preferably from −35° to 35°.

Advantageously, the bearing section is trough-shaped with a plurality of generatrices. Due to the shape of the pan-shaped bearing section, the cutting bodies become already positioned in the recesses upon insertion and, therefore, can be simply secured in the thread. The trough-shaped bearing section is advantageously formed complementary to the profile of the outer surface of the insertable cutting body that abuts the trough-shaped bearing section. The shape of the bearing section provides for encasing of the securable cutting body close to its shape in some regions and, thus, an advantageous anchoring of the cutting body in the thread.

Advantageously, the cutting body lies on one of the limiting surfaces of the respective recess. Thereby, there are available, in the thread, several contact surfaces between the cutting body and the thread for securing the cutting body. In this embodiment, the cutting body advantageously is spaced from another of the limiting surfaces. Thereby, the remaining space, in the recess, forms a chip space, e.g., for receiving the drillings. The chip space enables transportation of the drillings in the direction of shaft, without any substantial increase of the screw-in torque. Mineral constructional components such as concrete include reinforcing iron that can lie, as the case may be, in the region of the borehole the screw is set in. In case the reinforcing iron is located in the region of the borehole, the iron chips can likewise be received in the chip space. The provision of the chip space enables an advantageous transportation of drillings and drilling dust, in particular, in different mineral components.

Advantageously, the chip space has a volume that corresponds to from 0.1 times to 5 times of the volume of a cutting body. Further advantageously, the minimal distance of the chip space from the shaft outer surface is smaller then the minimal distance by which the bearing section of a recess is spaced from the shaft outer surface. Particularly advantageously, the chip space extends up to the shaft or into the shaft. This insures transportation of the produced drillings in the direction of the shaft in an advantageous manner.

Advantageously, a free space is provided between the pan-shaped bearing section and one of the limiting surfaces of each of the recesses. This substantially facilitates positioning of the cutting body. The free space prevents steps or projections in this region during formation of the recess that would have hindered a flat abutment of the cutting body with the bearing section. In particular, when the cutting body abuts not only the bearing section but also a limiting surface of the recess, the provision of the free space between these regions of the recess is advantageous for a perfect positioning and fixing of the cutting body in the recess.

Advantageously, in the transition region between one of the limiting walls and the radial profile of the thread, a chamfer that extends from the shaft outer surface is provided. Thereby, a correct positioning of the cutting body in the recess is insured. In addition, a greater contact surface of the bearing section in this region. Advantageously, the chamfer is formed on the limiting wall which the cutting body abuts. In particular, when the cutting body is secured in the recess by wielding, the chamfer prevents transmission of heat in the region of the radial outer profile of the thread in which only little material of the thread is available and which can be distorted to an undesirable degree if too much heat is transmitted to this region.

Advantageously, the bearing section has a stop rim adjacent to the free end region of the shaft and which projects from the shaft outer surface. The stop rim enables an easy positioning in the recess of the inserted cutting body. In addition, a large contact surface of the bearing section with the cutting is available for securing the cutting body in the thread. The stop rim of the bearing surface extends starting from the shaft outer side, over a certain height in the direction of the radial outer profile of the thread.

Advantageously, the bearing section has a stop rim remote from the free end region of the shaft and which projects from the shaft outer surface. The stop rim enables an easy positioning in the recess of the inserted cutting body. In addition, a large contact surface of the bearing section with the cutting is available for securing the cutting body in the thread. The stop rim of the bearing surface extends starting from the shaft outer side, over a certain height in the direction of the radial outer profile of the thread.

Advantageously, the height of the stop rim adjacent to the free end region of the shaft, proceeding from the shaft outer surface is greater than a corresponding height of the side stop rim remote from the free end region of the shaft. This further improves the positioning of the inserted cutting body in the recess.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
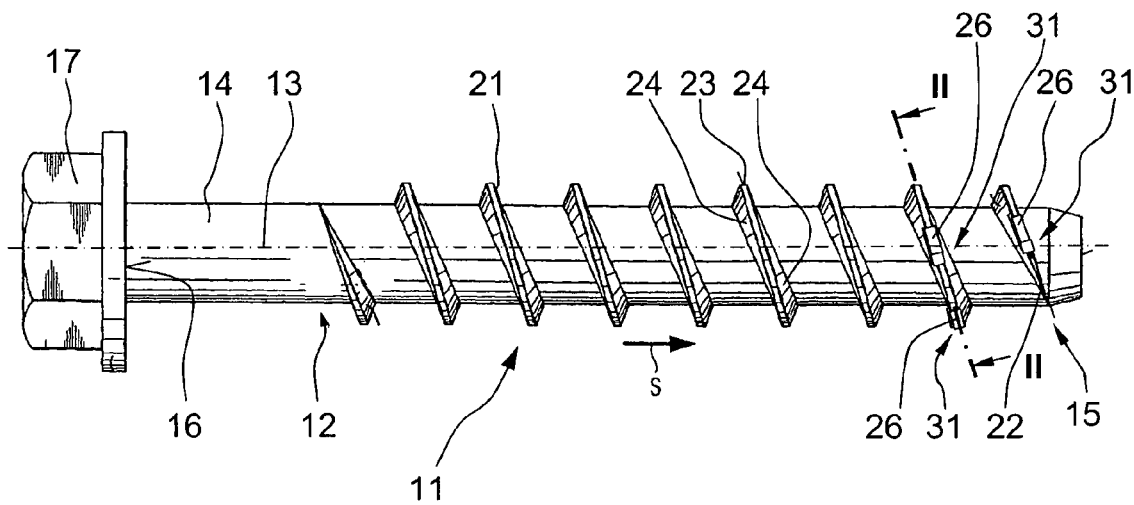
FIG. 1 a side view of a screw according to the present invention.
Figure 2:
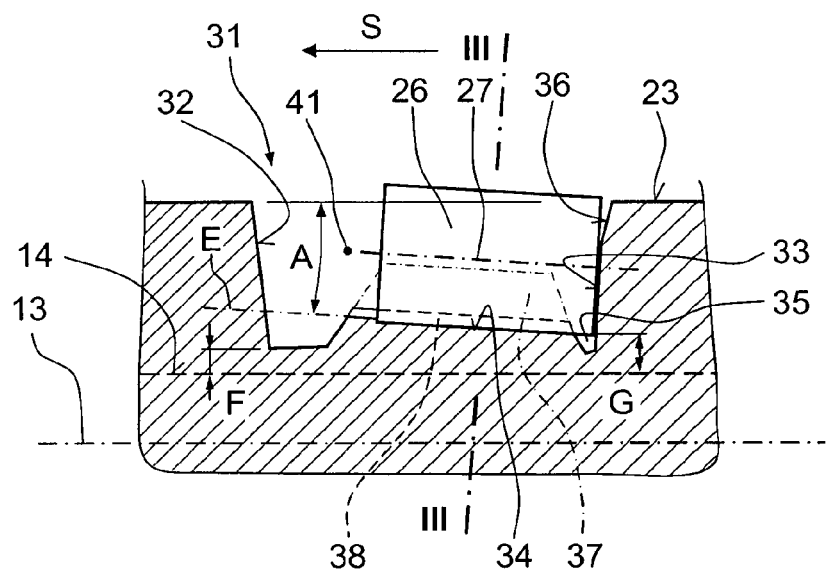
FIG. 2 a cross-sectional view through the thread and a cutting body along line II-II in FIG. 1 at an increased scale.
Figure 3:
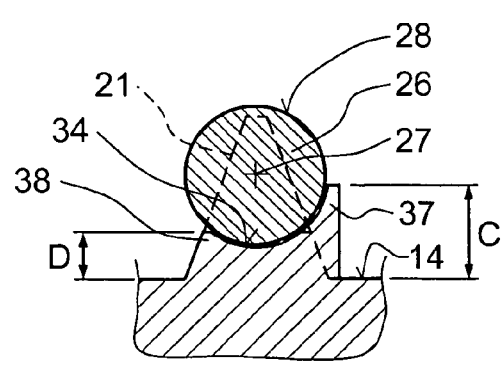
FIG. 3 a cross-sectional view through the cutting body along line III-III in FIG. 2.

A screw 11 according to the present invention, which is shown in FIGS. 1 through 3, has a shaft 12 and a thread 21 formed integrally with the shaft 12 and surrounding the shaft 12 at least in some regions.

The shaft 12 extends along a longitudinal axis of the screw 11 and has a radially outer surface 14 and a free end region 15. At an opposite end 16 of the shaft 12, there is provided a hexagonal screw head that forms rotation-transmitting means 17. In FIGS. 1 and 2, the arrow P indicates the screw-in direction of the screw 11.

The thread 21 has, in the free end region 15 of the shaft 12, a thread pilot 22, a radial outer profile 23, and two side flanks 24. In the thread 21, there are provided recesses 31 which are open radially outwardly and which have a first limiting wall 32 adjacent to the thread pilot 22, a second limiting wall 33 remote from the thread pilot 22, and a trough-shaped bearing section 34. The trough-shaped bearing section 34 has plurality generatrices, which extends essentially along the course of the thread 21, for receiving, at least in some regions, the outer surface of a cutting body 26. A plane E, in which the bearing section 34 lies, forms with a radial outer profile 23 of the thread 21 an angle A of 20°.

In the recesses 31, there are provided cutting bodies 26 which are formed of a material, the hardness of which is greater than the hardness of the thread 21. The cylindrical cutting bodies 26 have a circular cross-section, a longitudinal axis 27 that is aligned with the course of the thread 21, and an outer surface 28 surrounding the axis 27.

The cutting bodies 26 lie on the second limiting surface 33 remote from the thread pilot 22. A free space 35 is provided between the bearing section 34 and the second limiting wall 33. A chamfer 36 is provided in the transitional region between the second limiting surface 33 and the radial outer profile 23 of the thread 21.

The bearing section 34 has a first side stop rim 37 adjacent to the free end region 15 of the shaft 12, and a second side stop rim 38 remote from the free end region 15 of the shaft 12. The first and second stop rims 37 and 38 extend from the shaft outer surface 14. The height C of the first side outer rim 37, proceeding from the shaft outer surface 14, is greater than the corresponding height D of the second side step rim 38.

Between the cutting body 26 and the first limiting surface 32 of the recess 31 and adjacent to the thread pilot 22, there is provided a gap 41. The gap 41 has a volume that corresponds to from 0.3 to 5 times the volume of the cutting body 26. A minimal distance F of the gap 41 to shaft outer surface 14 is smaller than a minimal distance G of the bearing section 34 of the recess 31 to the shaft outer side 14.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A screw (11), comprising:
a shaft (12) having an outer radial surface (14) and a free end region (15);
at least one thread (21) arranged on the shaft (12), circumferentially surrounding the shaft (12) at least in some regions, and having a radial outer profile (23), two side flanks (24), a thread pilot (22) located in the free region (15) of the shaft (12), and a plurality of recesses (31) provided in the thread (21) and opening radially outwardly, the recesses (31) each having a first limiting wall (32) facing the thread pilot (22) and a second limiting wall (33) remote from the thread pilot (22); and a plurality of cutting bodies (26) formed of a material having a hardness greater than a hardness of the thread, located in the recesses (31) formed in the thread (21) and having each a longitudinal axis (27) and an outer surface (28) surrounding the axis (27) at a distance therefrom, the recesses (31) each having a trough-shaped bearing section (34) formed in the bottom of the recess and having a profile complementary to a profile of the outer surface of a respective cutting body for receiving and encasing, at least in some regions, the outer surface (28) of the respective cutting body (26), the trough-shaped bearing section having an axis oriented substantially in a direction of the thread (21).

2. A screw according to claim 1, wherein the cutting body (26) lies on one of the limiting walls (33, 34) of a respective recess (31).

3. A screw according to claim 1, wherein a free space (35) is provided between the bearing section (34) and one of the limiting walls (34, 33) of each of the recesses (31).

4. A screw according to claim 1, wherein a transition region between one of the limiting walls (33) and a radial profile (23) of the thread is provided with a chamfer (36).

5. A screw according to claim 1, wherein the bearing section (34) has a side stop rim (37) which is located close to the free end region (15) of the shaft (12) and which projects from the shaft outer surface (14).

6. A screw according to claim 1, wherein the bearing section (34) has a side stop rim (38) remote from the free end region (15) of the shaft (12) and which projects from the shaft outer surface (14).

7. A screw according to claim 1, wherein the trough-shaped bearing section (34) has a plurality of generatrices.

8. A screw (11), comprising:
a shaft (12) having an outer radial surface (14) and a free end region (15);
at least one thread (21) arranged on the shaft (12), circumferentially surrounding the shaft (12) at least in some regions, and having a radial outer profile (23), two side flanks (24), a thread pilot (22) located in the free region (15) of the shaft (12), and a plurality of recesses (31) provided in the thread (21) and opening radially outwardly, the recesses (31) each having a first limiting wall (32) facing the thread pilot (22) and a second limiting wall (33) remote from the thread pilot (22); and
a plurality of cutting bodies (26) formed of a material having a hardness greater than a hardness of the thread, located in the recesses (31) formed in the thread (21) and having each a longitudinal axis (27) and an outer surface (28) surrounding the axis (27) at a distance therefrom, the recesses (31) each having a bearing section (34) with a plurality of generatrices extending substantially along a course of the thread (21) for receiving at least in some regions, the outer surface (28) of the respective cutting body (26), wherein the bearing surface (34) has a side stop rim (3) located close to the free end region (15) of the shaft (12), projecting from the shaft outer surface (14) and having proceeding from the shaft outer surface (14), a height (C) greater than a corresponding height (D) of a side top rim (38) remote from the free end region (15) of the shaft (12) and likewise projecting from the outer surface of the shaft.

9. A screw according to claim 8, wherein the bearing section (34) is trough-shaped and has a profile complementary to the outer-surface of the respective cutting body (26).

* * * * *